(No Model.)
P. MOENNICH.
INDUCTION TELEMETER.
No. 416,006. Patented Nov. 26, 1889.
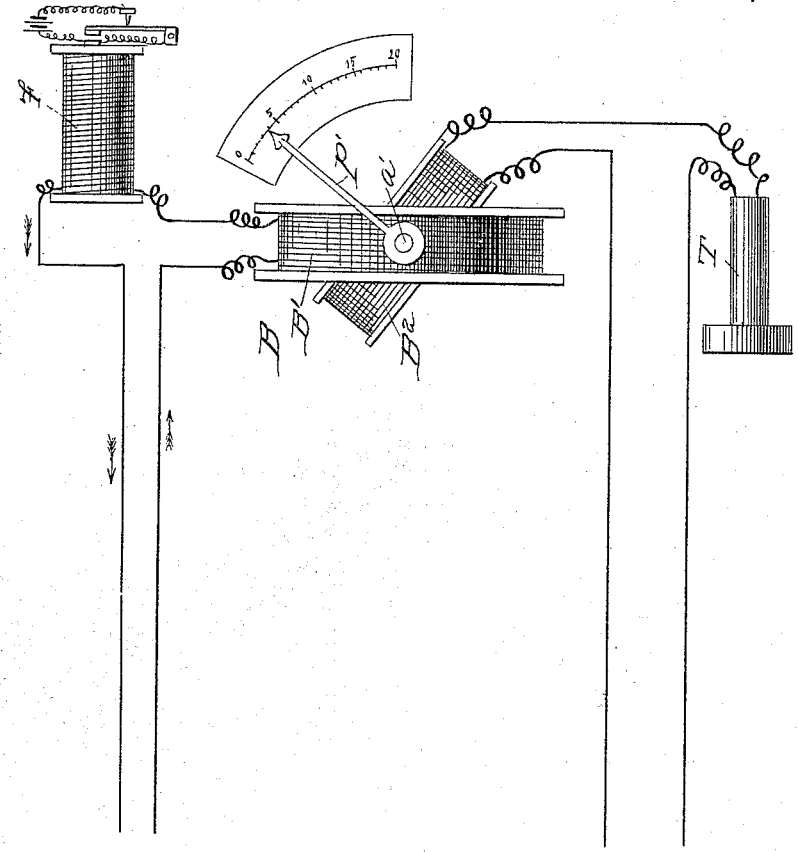
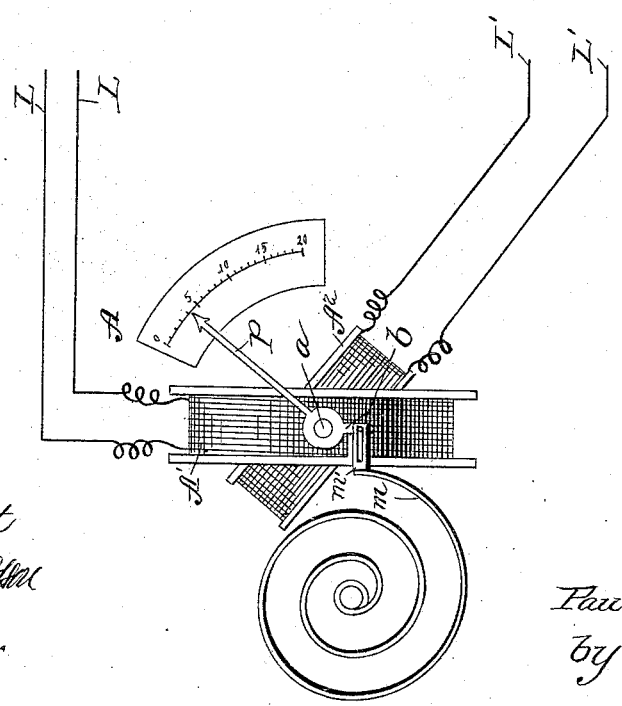
Attest
W. Donaldson
W. P. Keene
Inventor
Paul Moennich
by Ellis Spear
Atty.

UNITED STATES PATENT OFFICE.

PAUL MOENNICH, OF GEHLSDORF, NEAR ROSTOCK, MECKLENBURG-SCHWERIN, GERMANY.

INDUCTION-TELEMETER.

SPECIFICATION forming part of Letters Patent No. 416,006, dated November 26, 1889.

Application filed September 30, 1886. Serial No. 214,912. (No model.) Patented in Germany August 11, 1887, No. 40,295.

*To all whom it may concern:*

Be it known that I, PAUL MOENNICH, of Gehlsdorf, near Rostock, in the Great Dukedom of Mecklenburg-Schwerin, and German Empire, have invented a new and useful Contrivance for the Electric Transmission of the Indications of Measuring-Instruments, of which the following is a specification, reference being had therein to the accompanying drawing.

This invention has been patented to me in Germany under date August 11, 1887, No. 40,295.

My invention relates to a contrivance for the electric transmission of the indications of measuring-instruments.

The figure of the drawing illustrates in diagram this contrivance.

At station A, where the measuring-instrument $m$ (metal thermometer) is set up and the indications of which are to be transmitted to a distant place B by means of electricity, there are two wire coils $A'$ and $A^2$. The larger coil $A'$ is stationary, whereas the smaller coil $A^2$ is made to revolve easily inside the larger coil $A'$ and round axle $a$. The pointer $p$ of the measuring-instrument is connected with the axle $a$ of the coil $A^2$, so that it transmits its revolving motion to the coil $A^2$. The movements or variations of the measuring-instrument $m$ are transmitted to the coil $A^2$ through the shaft $a$ of said coil and the short arm $b$ of the pointer-lever $p$, which is located on the said shaft $a$ of the coil. The connection between the instrument $m$ and the short arm of the lever consists of a pin entering a slot in the plate $m'$. In this way the measuring-instrument (metal thermometer, registering-barometer, aneroid barometer) exercises by means of a lever such a rotating effect on coil $A^2$ that the different positions of coil $A^2$ to coil $A'$ answer to the different indications of pointer $p$. Any position of the two coils to each other and the corresponding indication of the measuring-instrument can be ascertained and determined at the observation-station B in the following way: At station B there is a similar system of coils to those at station A. The stationary coil is marked $B'$ and the revoluble coil $B^2$. The indicator (pointer) $p'$ is firmly connected with the axis $a'$ of the coil $B^2$.

The stationary larger coils $A'$ $B'$ are connected with each other by a current-conductor L, to which an induction apparatus of any desirable construction is applied at I. This induction apparatus sends currents in quick succession through the conducting-wire L and through the coils $A'$ $B'$, connected with the latter. The secondary coils $A^2$ $B^2$ are likewise connected with each other by a closed current-conductor $L'$, to which a telephone T is applied (attached) at station B. The (primary) currents in $A'$ $B'$ and conducting-wire L produce in consequence of this induced (secondary) currents in the revolving coils $A^2$ and $B^2$. The strength of these induced currents depends materially on the position of the secondary coils $A^2$ $B^2$ relatively to the larger (primary) coils $A'$ $B'$; but in all cases in which the two secondary coils occupy the same relative positions to the primary coils the two induced currents will have the same intensity.

At any time the relative position of the wire coils of station A to each other can be ascertained at station B by turning coil $B^2$ round the axis $a'$ until equality of the two inducing-currents has been produced. The indicator $p'$ then points to a place on the scale which answers to the equivalent position of the pointer $p$ of the measuring-instrument at station A.

A telephone T serves to indicate the relative intensity of the induced currents. The currents of the two secondary coils $A^2$ $B^2$ are for this purpose conducted through the telephone in opposite directions. If the induced currents are equal, the telephone ceases to sound; but whenever the least difference occurs a tone can be heard.

What I claim, and desire to secure by Letters Patent of the United States, is—

A contrivance for the electric transmission of the indications of measuring-instruments by means of induced currents, consisting of the primary coils $A'$ in the station A and $B'$ in the station B, connected with each other by current-conductor L, the induction apparatus sending currents in quick succession through the said coils A' and B', the secondary coils A² B² within the primary coils A' B', connected with each other by a closed current-conductor L', which sends secondary induced currents through the coils A² B², whose intensity varies with the position of secondary coils A² B² within the primary coils A' B', and the telephone T, for indicating the relative intensity of the induced currents, the pointer $p$, secured to coil A², and the pointer $p'$, connected to coil B², substantially as described.

In witness whereof I have hereunto set my hand in presence of two witnesses.

PAUL MOENNICH.

Witnesses:
GUSTAV KARSTEN,
BREHM,
*Director des Leb. Feuervers. Vereins von 1826.*